United States Patent
Pfau (10) Patent No.: US 12,110,036 B2
(45) Date of Patent: Oct. 8, 2024

(54) CONTROLLER FOR RIDER-ASSISTANCE SYSTEM, RIDER-ASSISTANCE SYSTEM, AND CONTROL METHOD FOR RIDER-ASSISTANCE SYSTEM

(71) Applicant: Robert Bosch GmbH, Stuttgart (DE)

(72) Inventor: Lars Pfau, Kanagawa (JP)

(73) Assignee: Robert Bosch GmbH, Stuttgart (DE)

( * ) Notice: Subject to any disclaimer, the term of this patent is extended or adjusted under 35 U.S.C. 154(b) by 76 days.

(21) Appl. No.: 18/002,909

(22) PCT Filed: Jun. 11, 2021

(86) PCT No.: PCT/IB2021/055150
§ 371 (c)(1),
(2) Date: Dec. 22, 2022

(87) PCT Pub. No.: WO2021/260477
PCT Pub. Date: Dec. 30, 2021

(65) Prior Publication Data
US 2023/0256987 A1    Aug. 17, 2023

(30) Foreign Application Priority Data
Jun. 26, 2020   (JP) ................................. 2020-110091

(51) Int. Cl.
*B60W 50/16*     (2020.01)
*B60Q 1/34*      (2006.01)
(Continued)

(52) U.S. Cl.
CPC ............. *B60W 50/16* (2013.01); *B60Q 1/346* (2013.01); *B60W 40/02* (2013.01);
(Continued)

(58) Field of Classification Search
CPC ................. B60W 50/16; B60W 40/02; B60W 2050/143; B60W 2050/146; B60W 2300/36; B60Q 1/346
See application file for complete search history.

(56) References Cited

U.S. PATENT DOCUMENTS

| | | | | |
|---|---|---|---|---|
| 3,829,110 A | * | 8/1974 | Ray | B62H 7/00 180/219 |
| 2003/0132837 A1 | * | 7/2003 | Hasegawa | G01C 9/06 340/440 |
| 2012/0173113 A1 | * | 7/2012 | Pilutti | B60W 30/0953 701/96 |
| 2013/0311075 A1 | * | 11/2013 | Tran | B60Q 1/535 701/117 |

(Continued)

FOREIGN PATENT DOCUMENTS

CN    214356446 U  * 10/2021
DE    102013218458 A1   3/2015
(Continued)

OTHER PUBLICATIONS

International Search Report and Written Opinion for Application No. PCT/IB2021/055150 dated Sep. 16, 2021 (10 pages).

*Primary Examiner* — Chico A Foxx
(74) *Attorney, Agent, or Firm* — Michael Best & Friedrich LLP (57) ABSTRACT

The present invention obtains a controller capable of improving assistance performance of a rider. The present invention also obtains a rider-assistance system including such a controller. The present invention further obtains a control method for such a rider-assistance system.
In the case where travel posture information of a lean vehicle (100) is acquired and the travel posture information is information indicating that leaning of the lean vehicle (100) exceeds a reference, initiation of first rider-assistance opera-
(Continued)

tion for assisting with driving by a rider by using information on a first target (T1) located on a side of a travel line (DL) of the lean vehicle (100) is prohibited, and initiation of second rider-assistance operation for assisting with driving by the rider using information on a second target (T2) located on the travel line (DL) of the lean vehicle (100) is permitted.

16 Claims, 5 Drawing Sheets

(51) Int. Cl.
  *B60W 40/02* (2006.01)
  *B60W 50/14* (2020.01)
(52) U.S. Cl.
  CPC .............. *B60W 2050/143* (2013.01); *B60W 2050/146* (2013.01); *B60W 2300/36* (2013.01)

(56) References Cited

U.S. PATENT DOCUMENTS

| | | | |
|---|---|---|---|
| 2017/0158195 A1* | 6/2017 | Uchida | B60W 30/143 |
| 2019/0111940 A1* | 4/2019 | Kinuhata | B62J 50/21 |
| 2020/0339144 A1* | 10/2020 | Oshida | B60W 40/112 |
| 2020/0398750 A1* | 12/2020 | Aizawa | B62J 50/22 |
| 2021/0188270 A1* | 6/2021 | Horn | B60W 50/14 |
| 2021/0221368 A1* | 7/2021 | Lavi | G06V 20/56 |
| 2022/0169273 A1* | 6/2022 | Horn | B62J 27/00 |

FOREIGN PATENT DOCUMENTS

| | | | | |
|---|---|---|---|---|
| EP | 3335955 A1 * | 6/2018 | | B60T 8/1706 |
| EP | 3640918 A1 | 4/2020 | | |
| EP | 3967587 A1 * | 3/2022 | | B60T 7/22 |
| EP | 3995387 A1 * | 5/2022 | | B60W 30/09 |
| JP | 2013060128 A * | 4/2013 | | |
| JP | 2013084242 A | 5/2013 | | |
| WO | 2018003926 A1 | 1/2018 | | |

* cited by examiner

CONTROLLER FOR RIDER-ASSISTANCE SYSTEM, RIDER-ASSISTANCE SYSTEM, AND CONTROL METHOD FOR RIDER-ASSISTANCE SYSTEM

BACKGROUND OF THE INVENTION

The present invention relates to a controller for a rider-assistance system that is mounted to a lean vehicle and includes at least one surrounding environment detector for outputting surrounding environment information of the lean vehicle, a rider-assistance system including such a controller, and a control method for such a rider-assistance system.

As a conventional rider-assistance system, such a rider-assistance system is available that is mounted to a lean vehicle, includes at least one surrounding environment detector for outputting surrounding environment information of the lean vehicle, acquires first target information as information on a first target located on a side of a travel line of the lean vehicle on the basis of the surrounding environment information, and executes first rider-assistance operation for assisting with driving by a rider of the lean vehicle by using the first target information (for example, see DE-A-102013218458).

SUMMARY OF THE INVENTION

In regard to the conventional rider-assistance system, in order to improve assistance performance for the rider, it may be examined to execute, in addition to the first rider-assistance operation using the first target information, second rider-assistance operation for assisting with driving by the rider of the lean vehicle by using second target information as information on a second target located on the travel line of the lean vehicle. However, it has not been examined on a type of a relationship that should be established between the first rider-assistance operation and the second rider-assistance operation in order to execute the first rider-assistance operation and the second rider-assistance operation at the time when the lean vehicle travels in a state of leaning significantly.

The present invention has been made with the above-described problem as the background and therefore obtains a controller capable of improving assistance performance for a rider. The present invention also obtains a rider-assistance system including such a controller. The present invention further obtains a control method for such a rider-assistance system.

A controller according to the present invention is a controller for a rider-assistance system that is mounted to a lean vehicle and includes at least one surrounding environment detector for outputting surrounding environment information of the lean vehicle. The controller includes: a first acquisition section that acquires, on the basis of the surrounding environment information, first target information that is information on a first target located on a side of a travel line of the lean vehicle; and a first execution section that makes the rider-assistance system initiate first rider-assistance operation for assisting with driving by a rider of the lean vehicle according to the first target information acquired by the first acquisition section, and further includes: a second acquisition section that acquires, on the basis of the surrounding environment information, second target information that is information on a second target located on the travel line of the lean vehicle; a second execution section that makes the rider-assistance system initiate second rider-assistance operation for assisting with driving by the rider according to the second target information acquired by the second acquisition section; and a third acquisition section that acquires travel posture information as information on a travel posture of the lean vehicle. In the case where the travel posture information, which is acquired by the third acquisition section, is information indicating that leaning of the lean vehicle exceeds a reference, the initiation of the first rider-assistance operation by the first execution section is prohibited, and the initiation of the second rider-assistance operation by the second execution section is permitted.

A rider-assistance system according to the present invention includes the above controller.

A control method according to the present invention is a control method for a rider-assistance system that is mounted to a lean vehicle and includes at least one surrounding environment detector for outputting surrounding environment information of the lean vehicle. The control method includes: a first acquisition step in which a first acquisition section of a controller acquires, on the basis of the surrounding environment information, first target information that is information on a first target located on a side of a travel line of the lean vehicle; and a first execution step in which a first execution section of the controller makes the rider-assistance system initiate first rider-assistance operation for assisting with driving by a rider of the lean vehicle according to the first target information acquired in the first acquisition step, and further includes: a second acquisition step in which a second acquisition section of the controller acquires, on the basis of the surrounding environment information, second target information that is information on a second target located on the travel line of the lean vehicle; a second execution step in which the second execution section of the controller makes the rider-assistance system initiate second rider-assistance operation for assisting with driving by the rider according to the second target information acquired in the second acquisition step; and a third acquisition step in which a third acquisition section of the controller acquires travel posture information as information on a travel posture of the lean vehicle. In the case where the travel posture information, which is acquired in the third acquisition step, is information indicating that leaning of the lean vehicle exceeds a reference, the initiation of the first rider-assistance operation by the first execution section is prohibited, and the initiation of the second rider-assistance operation by the second execution section is permitted.

In the controller, the rider-assistance system, and the control method according to the present invention, the travel posture information of the lean vehicle is acquired. In the case where the travel posture information is the information indicating that leaning of the lean vehicle exceeds the reference, the initiation of the first rider-assistance operation is prohibited, and the initiation of the second rider-assistance operation is permitted. In the first rider-assistance operation, it is necessary to acquire the first target information, that is, the information on the first target that is located on the side of the travel line of the lean vehicle. Thus, when the lean vehicle travels in a state of leaning significantly, a detection range of the surrounding environment detector is likely to be shifted. Meanwhile, in the second rider-assistance operation, the second target information, that is, the information on the second target that is located on the travel line of the lean vehicle only needs to be acquired. Thus, such shifting is unlikely to occur. Accordingly, in the case where the travel posture information of the lean vehicle is the information indicating that leaning of the lean vehicle exceeds the reference, the initiation of the first rider-assistance operation is prohibited, and the initiation of the second rider-assistance operation is permitted. Therefore, it is possible to appropriately assist with driving by the rider by the second rider-assistance operation while suppressing driving by the rider from being hindered by inappropriate execution of the first rider-assistance operation. As a result, assistance performance for the rider is improved.

DETAILED DESCRIPTION

A description will hereinafter be made on a controller, a rider-assistance system, and a control method according to the present invention with reference to the drawings.

Each of a configuration, operation, and the like, which will be described below, is merely one example, and the controller, the rider-assistance system, and the control method according to the present invention are not limited to a case with such a configuration, such operation, and the like.

For example, a description will hereinafter be made on a case where the rider-assistance system according to the present invention is used for a two-wheeled motor vehicle. However, the rider-assistance system according to the present invention may be used for a lean vehicle other than the two-wheeled motor vehicle. The lean vehicle means a vehicle that travels while a vehicle body thereof leans to an inner side of a turn during turning travel. Examples of the lean vehicle are motorcycles (the two-wheeled motor vehicle and a three-wheeled motor vehicle) and a pedal-driven vehicle. The motorcycles include: a vehicle that has an engine as a propelling source; a vehicle that has an electric motor as the propelling source; and the like, and examples of the motorcycle are a bike, a scooter, and an electric scooter. The pedal-driven vehicle means a vehicle in general that can travel forward on a road by a depression force applied to pedals by the rider. The pedal-driven vehicles include a normal pedal-driven vehicle, an electrically-assisted pedal-driven vehicle, an electric pedal-driven vehicle, and the like.

The same or similar description will appropriately be simplified or will not be made below. In the drawings, the same or similar portions will be denoted by the same reference sign or will not be denoted by a reference sign. In addition, a detailed structure will appropriately be illustrated in a simplified manner or will not be illustrated.

A description will hereinafter be made on a rider-assistance system according to an embodiment.

<Configuration of Rider-Assistance System>

A description will be made on a configuration of the rider-assistance system according to the embodiment.

Figure 1:
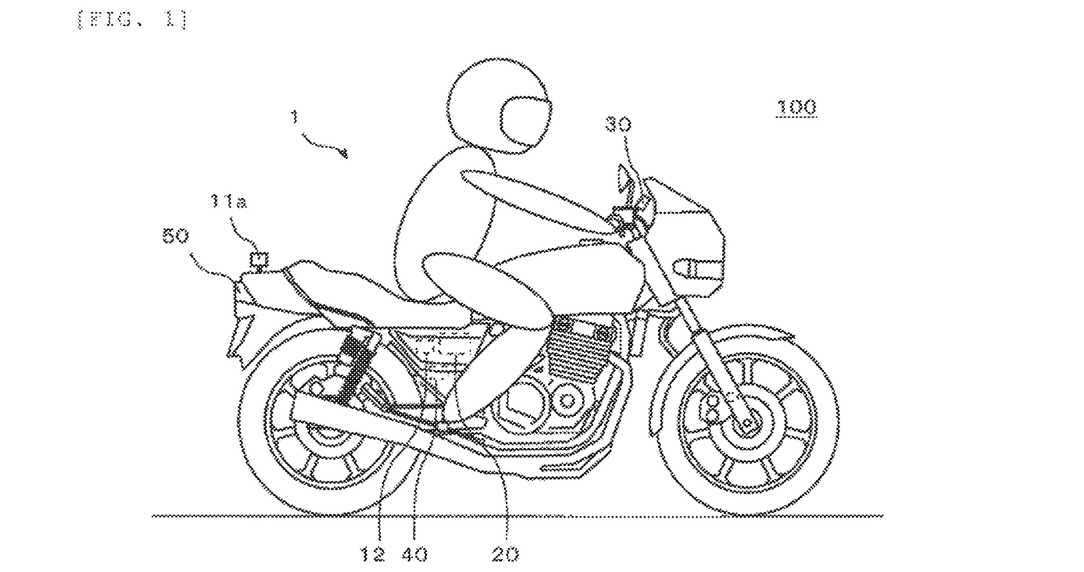
FIG. 1 is a view illustrating a mounted state of a rider-assistance system according to an embodiment of the present invention to a lean vehicle.
Figure 2:
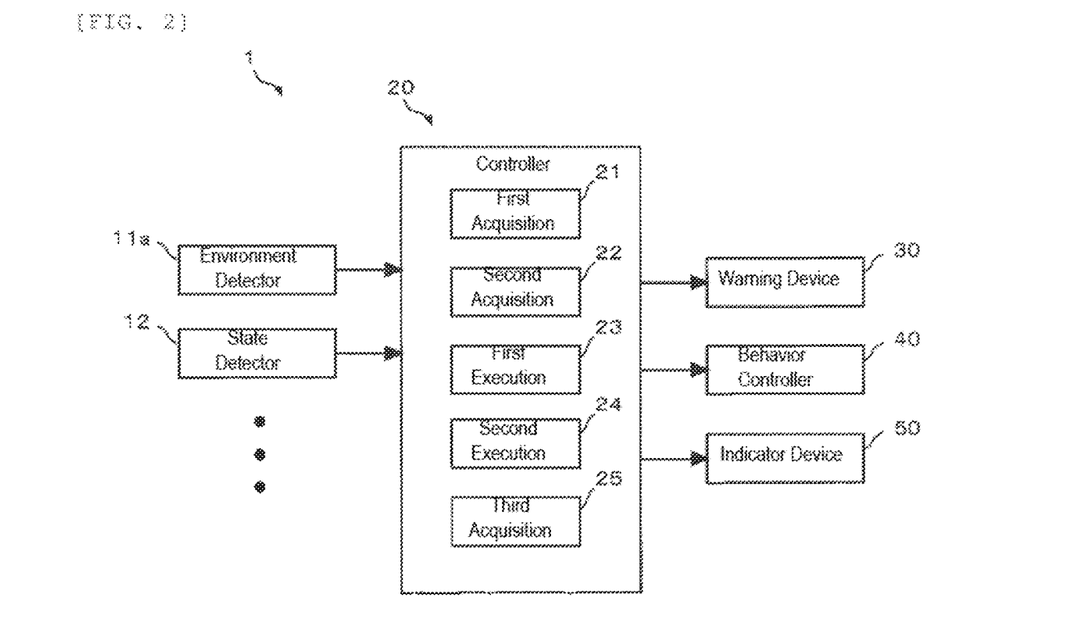
FIG. 2 is a diagram illustrating a system configuration of the rider-assistance system according to the embodiment of the present invention.
Figure 3:
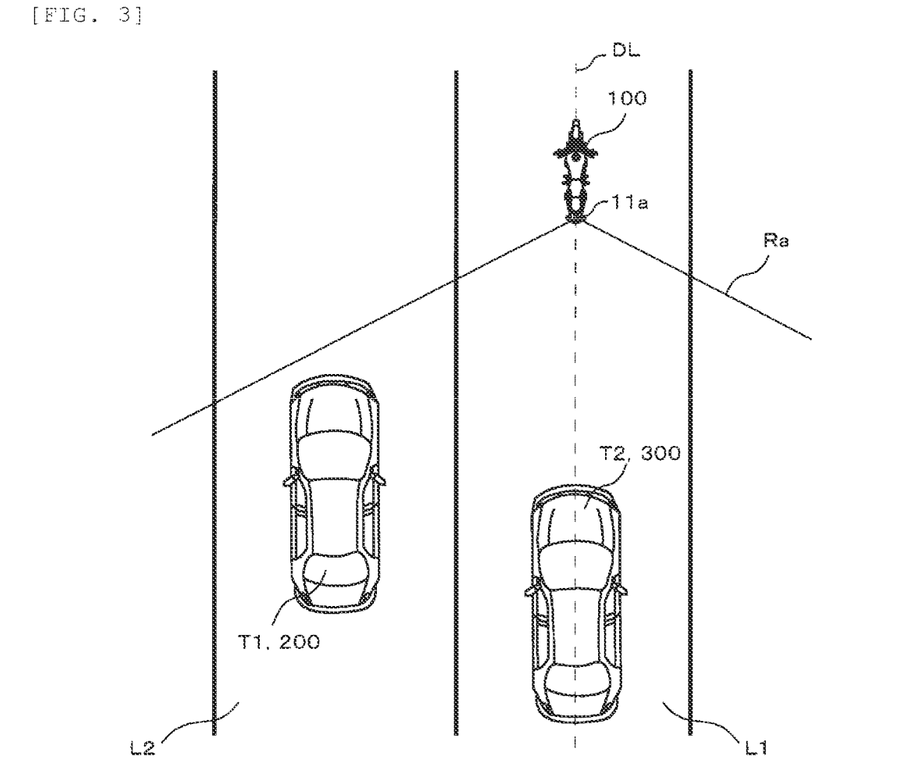
FIG. 3 is a view illustrating a detection state of a surrounding environment detector in the rider-assistance system according to the embodiment of the present invention.

FIG. 1 is a view illustrating a mounted state of the rider-assistance system according to the embodiment of the present invention to a lean vehicle. FIG. 2 is a diagram illustrating a system configuration of the rider-assistance system according to the embodiment of the present invention. FIG. 3 is a view illustrating a detection state of a surrounding environment detector in the rider-assistance system according to the embodiment of the present invention.

As illustrated in FIG. 1 to FIG. 3, a rider-assistance system 1 is mounted to a lean vehicle 100. The rider-assistance system 1 at least includes: a surrounding environment detector 11a that outputs surrounding environment information of the lean vehicle 100; a travel state detector 12 that outputs travel state information of the lean vehicle 100; and a controller (ECU) 20.

The rider-assistance system 1 uses the surrounding environment information, which is output from the surrounding environment detector 11a, to execute rider-assistance operation for assisting with driving by a rider of the lean vehicle 100. The controller 20 receives detection results by various detectors (not illustrated) that outputs other types of the information (for example, information on a brake operation state by the rider, information on an accelerator operation state by the rider, and the like) when necessary. Each of the devices in the rider-assistance system 1 may exclusively be used for the rider-assistance system 1, or may be shared with another system.

Examples of the surrounding environment detector 11a are a radar, a Lidar sensor, an ultrasonic sensor, and a camera. The surrounding environment detector 11a is provided to a rear portion of the lean vehicle 100. The surrounding environment detector 11a faces a rear side on a travel line DL of the lean vehicle 100. The travel line DL is a swept path of the lean vehicle 100 in the past or the future. More specifically, a center axis of a detection range Ra of the surrounding environment detector 11a matches a longitudinal direction of a trunk section of the lean vehicle 100. In general, during travel of the lean vehicle 100, while a front wheel is steered, a longitudinal direction of a rear wheel always matches the longitudinal direction of the trunk section. Accordingly, even in a state where the lean vehicle 100 turns, the center axis of the detection range Ra of the surrounding environment detector 11a matches the longitudinal direction of the trunk section of the lean vehicle 100. The center axis of the detection range Ra of the surrounding environment detector 11a may face upward or downward with respect to a road surface. Even in such a case, in the state where the lean vehicle 100 turns, an angular relationship between the center axis of the detection range Ra of the surrounding environment detector 11a and the longitudinal direction of the trunk section of the lean vehicle 100 does not change. During the travel of the lean vehicle 100, the surrounding environment detector 11a constantly detects a distance and a direction of a target in the detection range Ra with respect to the lean vehicle 100. Both of an area and an orientation of the detection range Ra of the surrounding environment detector 11a may be fixed, or at least one of the area and the orientation thereof may be changed.

The travel state detector 12 includes a vehicle speed sensor and an inertia sensor (IMU). The vehicle speed sensor detects a vehicle speed generated on the lean vehicle 100. The inertia sensor detects a three-axis acceleration and three-axis (roll, pitch, and yaw) angular velocities generated on the lean vehicle 100. The travel state detector 12 may detect other physical quantities that can substantially be converted to the vehicle speed generated on the lean vehicle 100, the three-axis acceleration generated on the lean vehicle 100, and the three-axis angular velocities generated on the lean vehicle 100. In addition, the inertia sensor may partially detect the three-axis acceleration and the three-axis angular velocities.

The controller 20 at least includes a first acquisition section 21, a second acquisition section 22, a first execution section 23, and a second execution section 24. The sections of the controller 20 may collectively be provided in a single casing or may separately be provided in multiple casings. In addition, the controller 20 may partially or entirely be constructed of a microcomputer, a microprocessor unit, or the like, may be constructed of a member in which firmware or the like can be updated, or may be a program module or the like that is executed by a command from a CPU or the like, for example.

The first acquisition section 21 acquires, on the basis of the output of the surrounding environment detector 11a, information on another vehicle 200 that travels obliquely behind the lean vehicle 100, and another vehicle 200 is a first target T1 that is located on a side of the travel line DL of the lean vehicle 100. The second acquisition section 22 acquires, on the basis of the output of the surrounding environment detector 11a, information on another vehicle 300 that travels behind the lean vehicle 100, and another vehicle 300 is a second target T2 that is located on the travel line DL of the lean vehicle 100.

The first execution section 23 initiates first rider-assistance operation for assisting with driving by the rider of the lean vehicle 100 according to first target information that is the information on another vehicle 200 acquired by the first acquisition section 21. The second execution section 24 initiates second rider-assistance operation for assisting with driving by the rider of the lean vehicle 100 according to second target information that is the information on another vehicle 300 acquired by the second acquisition section 22.

More specifically, the first execution section 23 derives an index value I of a collision possibility between the lean vehicle 100 and another vehicle 200. The second execution section 24 derives the index value I of a collision possibility between the lean vehicle 100 and another vehicle 300. The index value I is at least a combination of a reciprocal of a relative distance Dr of respective one of the other vehicles 200, 300 to the lean vehicle 100 and a relative speed Vr of respective one of the other vehicles 200, 300 to the lean vehicle 100. For the index value I, a relative acceleration Ar of respective one of the other vehicles 200, 300 to the lean vehicle 100 may further be combined. For example, the index value I is a value that is defined by the following formula 1 or the following formula 2. It means that the collision possibility becomes higher as the index value I is increased.

$$I = \frac{Vr}{Dr} \quad \text{[Formula 1]}$$

-continued $$I = \frac{Ar}{-Vr - \sqrt{Vr^2 - 2 \times Ar \times Dr}} \quad \text{[Formula 2]}$$

In the case where the derived index value I exceeds a reference value, the first execution section 23 determines that a collision possibly occurs between the lean vehicle 100 and another vehicle 200, and outputs a control command for initiating the first rider-assistance operation to various types of equipment in the lean vehicle 100, various types of equipment in another vehicle 200, and the like, for example.

An example of the first rider-assistance operation is warning operation to the rider of the lean vehicle 100. For example, the first execution section 23 outputs a control command to a warning device 30 that is provided to the lean vehicle 100, so as to make the warning device 30 execute the warning operation (for example, display of a warning sign, lighting of a warning lamp, warning by a warning buzzer or voice, warning by haptic vibration, or the like) to avoid approach of the lean vehicle 100 to another vehicle 200 (for example, a lane change from a lane L1 to a lane L2, the insufficient vehicle speed thereafter, or the like). The first execution section 23 may output the control command to a warning device that is provided to an accessory (for example, an article worn by the rider, a possession of the rider, or the like) associated with the lean vehicle 100.

An example of the first rider-assistance operation is behavior control operation of the lean vehicle 100. For example, the first execution section 23 outputs the control command to a behavior controller 40 that is provided to the lean vehicle 100, so as to make the behavior controller 40 execute the behavior control operation (for example, reduction in a braking force generated on the lean vehicle 100, increase in drive power generated on the lean vehicle 100, or the like) to avoid the approach of the lean vehicle 100 to another vehicle 200 (for example, the insufficient vehicle speed after the lane change from the lane L1 to the lane L2, or the like).

An example of the first rider-assistance operation is warning operation to a driver of another vehicle 200. For example, the first execution section 23 outputs the control command to a warning device that is provided to another vehicle 200, so as to make the warning device execute the warning operation (for example, display of a warning sign, lighting of a warning lamp, warning by a warning buzzer or voice, warning by haptic vibration, or the like) to avoid approach of another vehicle 200 to the lean vehicle 100 (for example, excessive increase in a vehicle speed after the lean vehicle 100 cuts in, continued travel on the lane L2, or the like). The first execution section 23 may output the control command to a warning device that is provided to an accessory (for example, an article worn by the driver, a possession of the driver, or the like) associated with another vehicle 200.

An example of the first rider-assistance operation is behavior control operation of another vehicle 200. For example, the first execution section 23 outputs the control command to a behavior controller that is provided to another vehicle 200, so as to make the behavior controller execute the behavior control operation (for example, reduction in drive power generated on another vehicle 200, increase in a braking force generated on another vehicle 200, automatic steering of another vehicle 200, or the like) to avoid the approach of another vehicle 200 to the lean vehicle 100 (for example, the excessive increase in the vehicle speed after the lean vehicle 100 cuts in, the continued travel on the lane L2, or the like).

In the case where the derived index value I exceeds the reference value, the second execution section 24 determines that a collision possibly occurs between the lean vehicle 100 and another vehicle 300, and outputs a control command for initiating the second rider-assistance operation to the various types of the equipment in the lean vehicle 100, various types of equipment in another vehicle 300, and the like, for example.

An example of the second rider-assistance operation is warning operation to the rider of the lean vehicle 100. For example, the second execution section 24 outputs the control command to the warning device 30, which is provided to the lean vehicle 100, so as to make the warning device 30 execute the warning operation (for example, the display of the warning sign, lighting of the warning lamp, warning by the warning buzzer or the voice, warning by the haptic vibration, or the like) to avoid approach of the lean vehicle 100 to another vehicle 300 (for example, the insufficient vehicle speed, continued travel on the lane L1, or the like). The second execution section 24 may output the control command to the warning device that is provided to the accessory (for example, the article worn by the rider, the possession of the rider, or the like) associated with the lean vehicle 100.

An example of the second rider-assistance operation is the behavior control operation of the lean vehicle 100. For example, the second execution section 24 outputs the control command to the behavior controller 40, which is provided to the lean vehicle 100, so as to make the behavior controller 40 execute the behavior control operation (for example, the reduction in the braking force generated on the lean vehicle 100, the increase in the drive power generated on the lean vehicle 100, or the like) to avoid the approach of the lean vehicle 100 to another vehicle 300 (for example, the insufficient vehicle speed or the like).

An example of the second rider-assistance operation is warning operation to a driver of another vehicle 300. For example, the second execution section 24 outputs the control command to an indicator light device 50 that is provided to the lean vehicle 100, so as to make the indicator light device 50 execute the warning operation (for example, continuous lighting, blinking, or the like) to avoid approach of another vehicle 300 to the lean vehicle 100 (for example, an excessive increase in a vehicle speed, continued travel on the lane L1, or the like). Alternatively, the second execution section 24 outputs the control command to a warning device that is provided to another vehicle 300, so as to make the warning device execute the warning operation (for example, display of a warning sign, lighting of a warning lamp, warning by a warning buzzer or voice, warning by haptic vibration, or the like) to avoid the approach of another vehicle 300 to the lean vehicle 100 (for example, the excessive increase in the vehicle speed, the continued travel on the lane L1, or the like). The second execution section 24 may output the control command to a warning device that is provided to an accessory (for example, an article worn by the driver, a possession of the driver, or the like) associated with another vehicle 300.

An example of the second rider-assistance operation is behavior control operation of another vehicle 300. For example, the second execution section 24 outputs the control command to a behavior controller that is provided to another vehicle 300, so as to make the behavior controller execute the behavior control operation (for example, reduction in drive power generated on another vehicle 300, increase in a braking force generated on another vehicle 300, automatic steering of another vehicle 300, or the like) to avoid the approach of another vehicle 300 to the lean vehicle 100 (for example, the excessive increase in the vehicle speed, the continued travel on the lane L1, or the like).

Here, the controller 20 further includes a third acquisition section 25. The third acquisition section 25 acquires, on the basis of the output of the travel state detector 12, travel posture information that is information on a travel posture of the lean vehicle 100. Examples of the travel posture information are a roll angle (0 in FIG. 4), a yaw rate, and lateral acceleration generated on the lean vehicle 100. That is, any type of the travel posture information can be used as long as the travel posture information acquired by the third acquisition section 25 includes information on a physical quantity with which a degree of leaning of the lean vehicle 100 can be estimated. The third acquisition section 25 may acquire the travel posture information not on the basis of the output of the travel state detector 12 but on the basis of travel position information of the lean vehicle 100 and map information.

In the case where the travel posture information, which is acquired by the third acquisition section 25, is information indicating that leaning of the lean vehicle 100 exceeds a reference, the initiation of the first rider-assistance operation by the first execution section 23 is prohibited, and the initiation of the second rider-assistance operation by the second execution section 24 is permitted. That is, the execution of the first rider-assistance operation is prohibited when the lean vehicle 100 leans significantly. Meanwhile, the second rider-assistance operation is executed under such a circumstance. Thus, even when the lean vehicle 100 leans significantly, the surrounding environment detector 11a is not unactuated, or the output of the surrounding environment detector 11a is not invalidated. In the case where the lean vehicle 100 leans further significantly, in addition to the first rider-assistance operation, the second rider-assistance operation may also be prohibited. In addition, the information on the first target T1 other than another vehicle 200, which is output from the surrounding environment detector 11a in the state where the first rider-assistance operation is prohibited, may be used supplementarily for the second rider-assistance operation or different rider-assistance operation from the first rider-assistance operation and the second rider-assistance operation. For example, in the state where the first rider-assistance operation is prohibited, as the information on the first target T1, information on a boundary position of the lane L1, on which the lean vehicle 100 travels, information on presence or absence of another lane that merges with or is branched from the lane L1, information on presence or absence of the lane L2 that is adjacent to the lane L1, information on a road surface condition, and the like may be acquired, and those types of the information may be used supplementarily. In this way, the avoidance of the collision between the lean vehicle 100 and the second target T2 may be assisted. Alternatively, the information on another vehicle 200, which is output from the surrounding environment detector 11a in the state where the first rider-assistance operation is prohibited, may be used supplementarily for the second rider-assistance operation or the different rider-assistance operation from the first rider-assistance operation and the second rider-assistance operation. Even in a situation where the lean vehicle 100 leans significantly, the information on another vehicle 200 can be acquired with a relatively low degree of accuracy. For this reason, such information can be used supplementarily for the second rider-assistance operation or the different rider-assistance operation from the first rider-assistance operation and the second rider-assistance operation.

Figure 4:
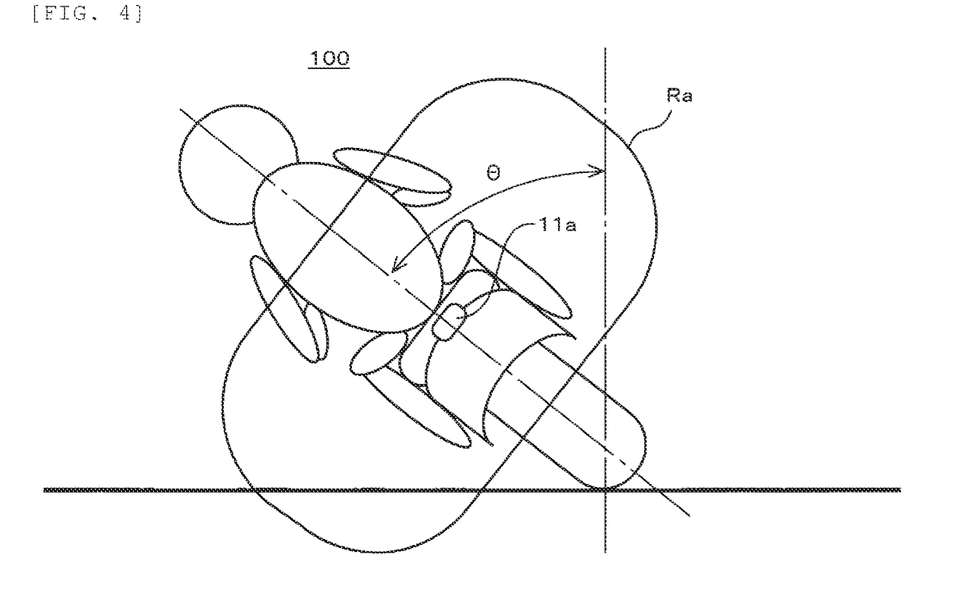
FIG. 4 is a view for illustrating an influence of leaning of the lean vehicle on the rider-assistance system according to the embodiment of the present invention.

FIG. 4 is a view for illustrating an influence of leaning of the lean vehicle on the rider-assistance system according to the embodiment of the present invention.

As illustrated in FIG. 4, under the circumstance where the lean vehicle 100 leans significantly, a region that is far from the lean vehicle 100 in the detection range Ra of the surrounding environment detector 11a, that is, a region that contributes to acquisition of the surrounding environment information used for the first rider-assistance operation shifts significantly, which makes it difficult to acquire the first target T1. Meanwhile, a region that is close to the lean vehicle 100 in the detection range Ra of the surrounding environment detector 11a, that is, a region that contributes to the acquisition of the surrounding environment information used for the second rider-assistance operation shifts relatively small. Thus, the acquisition of the second target T2 is not as difficult as the acquisition of the first target T1. Accordingly, in the case where the travel posture information, which is acquired by the third acquisition section 25, is the information indicating that leaning of the lean vehicle 100 exceeds the reference, the initiation of the first rider-assistance operation by the first execution section 23 is prohibited, and the initiation of the second rider-assistance operation by the second execution section 24 is permitted. In this way, it is possible to appropriately assist with the avoidance of the collision between the lean vehicle 100 and another vehicle 300 while suppressing driving by the rider from being hindered by inappropriate execution of the first rider-assistance operation.

<Operation of Rider-Assistance System>

A description will be made on operation of the rider-assistance system according to the embodiment.

Figure 5:
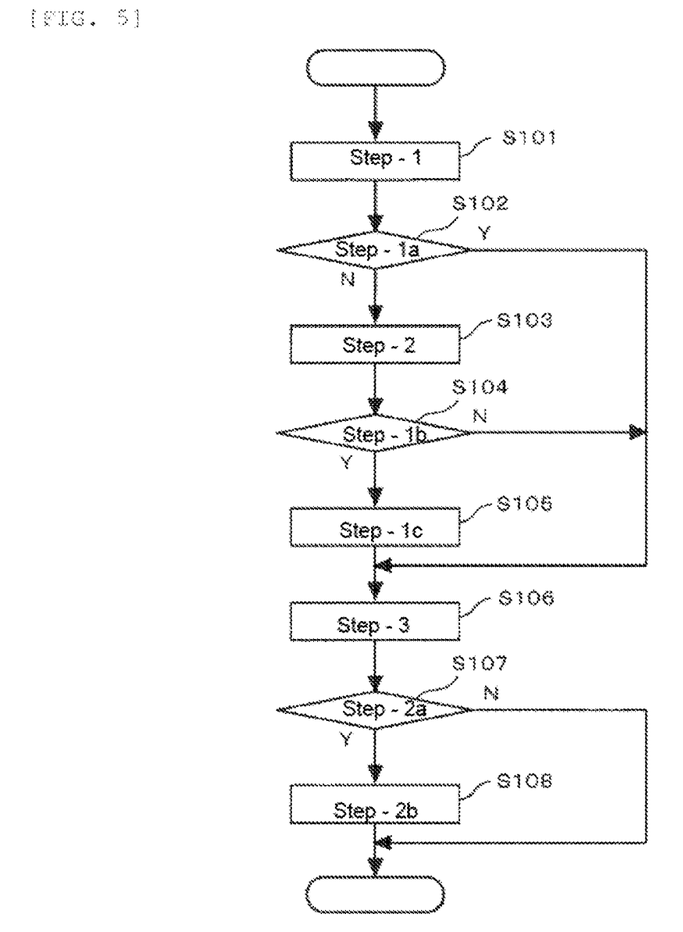
FIG. 5 is a chart illustrating an operation flow of a controller in the rider-assistance system according to the embodiment of the present invention.

FIG. 5 is a chart illustrating an operation flow of the controller in the rider-assistance system according to the embodiment of the present invention. An order of steps may appropriately be switched, or a different step may appropriately be added.

The controller 20 repeatedly executes the operation flow illustrated in FIG. 5 during the travel of the lean vehicle 100.

(Acquisition Step-1)

In step S101, the third acquisition section 25 acquires the travel posture information of the lean vehicle 100 on the basis of the output of the travel state detector 12.

(Execution Step-1a)

Next, in step S102, the first execution section 23 determines whether the travel posture information acquired in step S101 is the information indicating that leaning of the lean vehicle 100 exceeds the reference. If a determination result is Yes, the processing proceeds to step S106. If the determination result is No, the processing proceeds to step S103.

(Acquisition Step-2)

In step S103, the first acquisition section 21 acquires, on the basis of the output of the surrounding environment detector 11a, the information on another vehicle 200 that travels obliquely behind the lean vehicle 100, and another vehicle 200 is the first target T1 that is located on the side of the travel line DL of the lean vehicle 100.

(Execution Step-1b)

Next, in step S104, the first execution section 23 uses the information on another vehicle 200, which is acquired in step S103, to determine whether the collision possibility between the lean vehicle 100 and another vehicle 200 exceeds the reference. If a determination result is Yes, the processing proceeds to step S105. If the determination result is No, the processing proceeds to step S106.

(Execution Step-1c)

In step S105, the first execution section 23 executes the first rider-assistance operation for assisting with driving by the rider of the lean vehicle 100.

(Acquisition Step-3)

In step S106, the second acquisition section 22 acquires, on the basis of the output of the surrounding environment detector 11a, the information on another vehicle 300 that travels behind the lean vehicle 100, and another vehicle 300 is the second target T2 that is located on the travel line DL of the lean vehicle 100.

(Execution Step-2a)

Next, in step S107, the second execution section 24 uses the information on another vehicle 300, which is acquired in step S106, to determine whether a collision possibility between the lean vehicle 100 and another vehicle 300 exceeds the reference. If a determination result is Yes, the processing proceeds to step S108. If the determination result is No, the processing proceeds to step S101.

(Execution Step-2b)

In step S108, the second execution section 24 executes the second rider-assistance operation for assisting with driving by the rider of the lean vehicle 100.

Here, a criteria for the determination in step S102 in the case where the last determination result in step S102 is Yes may differ from the criteria for the determination in step S102 in the case where the last determination result in step S102 is No. In addition, in the case where the determination result in step S102 is Yes, step S103 to step S105 may forcibly be skipped until a lapse of a specified period regardless of the determination result in step S102.

Modified Examples

The embodiment of the present invention is not limited to that in the above description. That is, the present invention includes modes in each of which the embodiment that has been described so far is modified.

For example, the description has been made so far on the case where the surrounding environment detector 11a faces the rear side on the travel line DL of the lean vehicle 100. However, the surrounding environment detector 11a may face a front side on the travel line DL of the lean vehicle 100. That is, the first rider-assistance operation may be executed to assist with the avoidance of the collision between the lean vehicle 100 and the first target T1 (for example, another vehicle, a person, an animal, a road facility, or the like) that is located obliquely in front of the lean vehicle 100, and the second rider-assistance operation may be executed to assist with the avoidance of the collision between the lean vehicle 100 and the second target T2 (for example, another vehicle, a person, an animal, a road facility, or the like) that is located in front of the lean vehicle 100. Even in such a case, the acquisition of the second target T2 under the circumstance where the lean vehicle 100 leans significantly is not as difficult as the acquisition of the first target T1. Thus, the same control is effective. The surrounding environment detector 11a may be attached to a portion that does not rotate with a handlebar of the lean vehicle 100, or may be attached to a portion that rotates with the handlebar of the lean vehicle 100. Even in the case where the surrounding environment detector 11a is attached to the portion that rotates with the handlebar of the lean vehicle 100, the acquisition of the second target T2 is not as difficult as the acquisition of the first target T1 under the circumstance where the lean vehicle 100 leans significantly.

Figure 6:
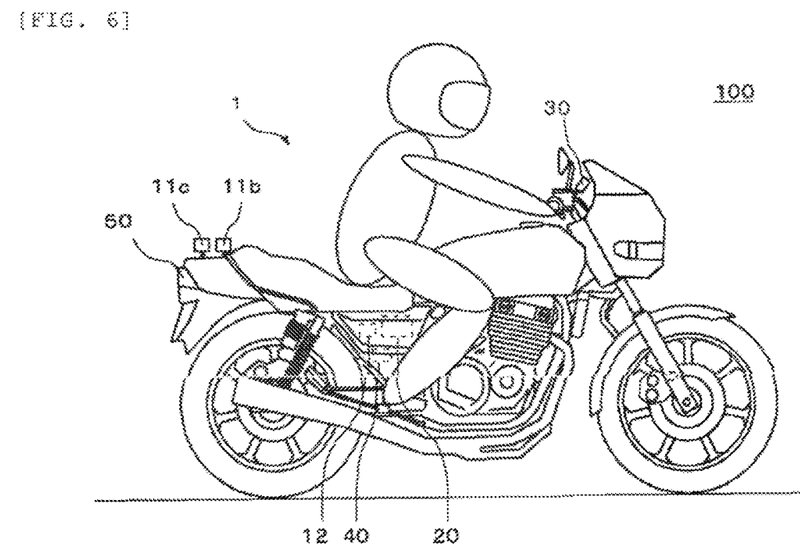
FIG. 6 is a view illustrating a mounted state of a rider-assistance system according to the embodiment of the present invention to a lean vehicle.
Figure 7:
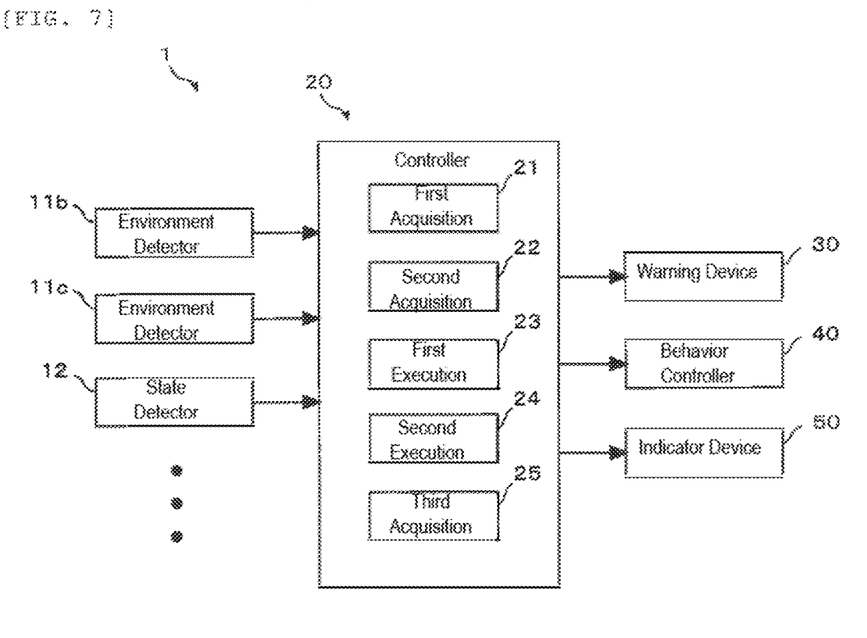
FIG. 7 is a diagram illustrating a system configuration of the rider-assistance system according to the embodiment of the present invention.
Figure 8:
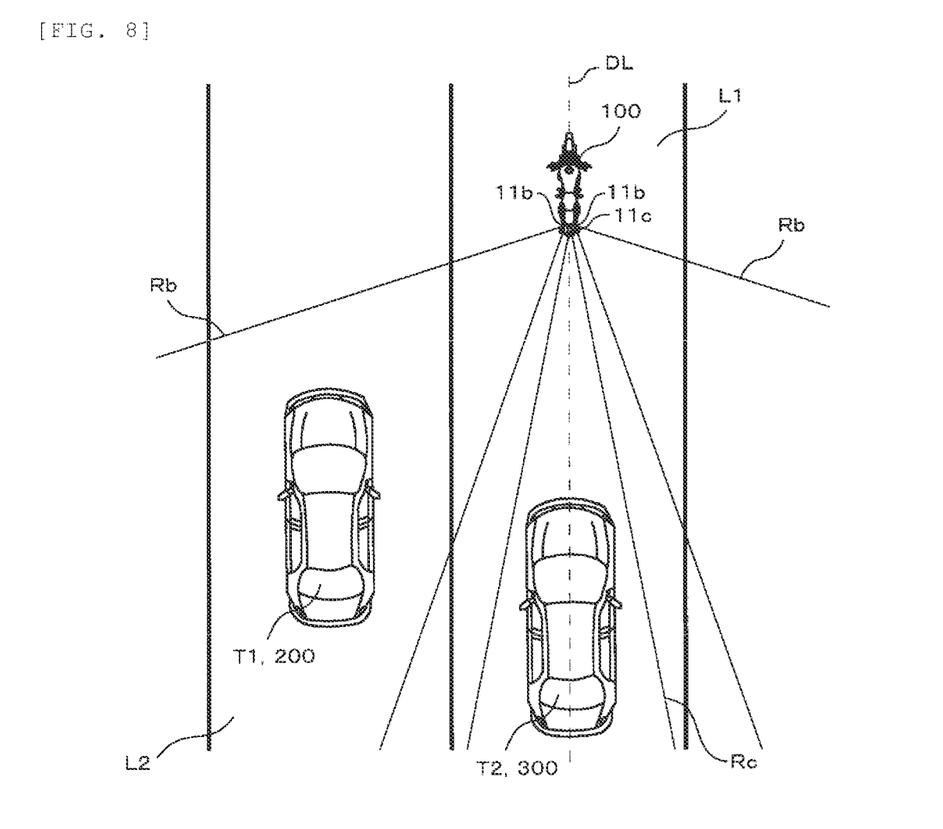
FIG. 8 is a view illustrating a detection state of a surrounding environment detector in the rider-assistance system according to the embodiment of the present invention.

FIG. 6 is a view illustrating a mounted state of the rider-assistance system according to the embodiment of the present invention to the lean vehicle. FIG. 7 is a diagram illustrating a system configuration of the rider-assistance system according to the embodiment of the present invention. FIG. 8 is a view illustrating a detection state of a surrounding environment detector in the rider-assistance system according to the embodiment of the present invention.

The description has been made so far on the case where the information on the first target T1 and the information on the second target T2 are acquired on the basis of the output of the common surrounding environment detector 11a. However, as illustrated in FIG. 6 to FIG. 8, the information on the first target T1 may be acquired on the basis of output of a first surrounding environment detector 11b that has a first detection range Rb, and the information on the second target T2 may be acquired on the basis of output of a second surrounding environment detector 11c that has a second detection range Rc. The first detection range Rb of the first surrounding environment detector 11b faces an oblique rear side, an oblique front side, or a side of the lean vehicle 100. The second detection range Rc of the second surrounding environment detector 11c faces the rear side or the front side of the lean vehicle 100. A center axis of the second detection range Rc of the second surrounding environment detector 11c matches the longitudinal direction of the trunk section of the lean vehicle 100. A center axis of the first detection range Rb of the first surrounding environment detector 11b or the center axis of the second detection range Rc of the second surrounding environment detector 11c may face upward or downward with respect to the road surface. Both of an area and an orientation of the first detection range Rb of the first surrounding environment detector 11b may be fixed, or at least one of the area and the orientation thereof may be changed. In addition, both of an area and an orientation of the second detection range Rc of the second surrounding environment detector 11c may be fixed, or at least one of the area and the orientation thereof may be changed. The first detection range Rb and the second detection range Rc may completely be separated from each other or may partially overlap. Furthermore, when the first rider-assistance operation is prohibited, the first surrounding environment detector 11b may be unactuated, or the output of the first surrounding environment detector 11b may be invalidated. Moreover, the actuation of the first surrounding environment detector 11b may be continued, and the information on the first target T1 other than another vehicle 200, which is output from the first surrounding environment detector 11b, or the information on another vehicle 200 may be used supplementarily for the second rider-assistance operation or the different rider-assistance operation from the first rider-assistance operation and the second rider-assistance operation.

For example, the description has been made so far on the case where a purpose of each of the first rider-assistance operation and the second rider-assistance operation is to assist with the avoidance of the collision occurring to the lean vehicle 100. However, the purpose of at least one of the first rider-assistance operation and the second rider-assistance operation may be different assistance from the avoidance of the collision occurring to the lean vehicle 100. For example, the purpose of the first rider-assistance operation may be notification of a congestion condition of the lane L2 adjacent to the lane L1, on which the lean vehicle 100 travels, to the rider, notification of a model of another vehicle 200 to the rider, or the like. For example, the purpose of the second rider-assistance operation may be notification of a congestion condition of the lane L1, on which the lean vehicle 100 travels, to the rider, notification of a model of another vehicle 300 to the rider, or the like.

REFERENCE SIGNS LIST

1: Rider-assistance system
11a, 11b, 11c: Surrounding environment detector
12: Travel state detector
20: Controller
21: First acquisition section
22: Second acquisition section
23: First execution section
24: Second execution section
25: Third acquisition section
30: Warning device
40: Behavior controller
50: Indicator light device
100: Lean vehicle
200, 300: Another vehicle
T1: First target
T2: Second target
DL: Travel line
L1, L2: Lane
Ra, Rb, Rc: Detection range

The invention claimed is:

1. An electronic controller (20) for a rider-assistance system (1) that is mounted to a lean vehicle (100) and includes at least one surrounding environment detector sensor (11a, 11b, 11c) for outputting surrounding environment information of the lean vehicle (100), the electronic controller (20) configured to:
    acquire, a first target (T1) located on a side of a travel line (DL) of the lean vehicle (100) based on the surrounding environment information, wherein the surrounding environment information includes first target information for the first target (T1);
    initiate a first rider-assistance operation of the rider-assistance system (1) for assisting with driving by a rider of the lean vehicle (100) according to the acquired first target information;
    acquire, a second target (T2) located on the travel line (DL) of the lean vehicle (100) based on the surrounding environment information, wherein the surrounding environment information includes second target information for the second target (T2);
    initiate a second rider-assistance operation of the rider-assistance system (1) for assisting with driving by the rider according to the acquired second target information;
    acquire a travel posture of the lean vehicle (100) based on travel posture information of the lean vehicle (100); and
    when the travel posture information indicates that leaning of the lean vehicle (100) exceeds a reference, prohibit the initiation of the first rider-assistance operation and permit the initiation of the second rider-assistance operation and when the travel posture information indicates that leaning of the lean vehicle (100) does not exceed the reference, permit the initiation of the first rider-assistance operation and the initiation of the second rider-assistance operation.

2. The electronic controller (20) according to claim 1, wherein the first rider-assistance operation includes warning operation to the rider.

3. The electronic controller (20) according to claim 1, wherein
the first rider-assistance operation includes behavior control operation of the lean vehicle (100).

4. The electronic controller (20) according to claim 1, wherein
the second rider-assistance operation includes warning operation to the rider.

5. The electronic controller (20) according to claim 1, wherein
the second rider-assistance operation includes behavior control operation of the lean vehicle (100).

6. The electronic controller (20) according to claim 1, wherein
the first target (T1) is another vehicle (200) that travels obliquely behind the lean vehicle (100), and
the second target (T2) is another vehicle (300) that travels behind the lean vehicle (100).

7. The electronic controller (20) according to claim 6, wherein
the first rider-assistance operation is warning operation to a driver of the another vehicle (200) that travels obliquely behind the lean vehicle (100).

8. The electronic controller (20) according to claim 6, wherein
the first rider-assistance operation includes behavior control operation of the another vehicle (200) that travels obliquely behind the lean vehicle (100).

9. The electronic controller (20) according to claim 6, wherein
the second rider-assistance operation includes warning operation to a driver of the another vehicle (300) that travels behind the lean vehicle (100).

10. The electronic controller (20) according to claim 6, wherein
the second rider-assistance operation includes behavior control operation of the another vehicle (300) that travels behind the lean vehicle (100).

11. The electronic controller (20) according to claim 1, wherein
the first target information and the second target information are acquired on the basis of output of the common surrounding environment detector sensor (11a) that is mounted to the lean vehicle (100).

12. The electronic controller (20) according to claim 1, wherein
the first target information is acquired on the basis of output of a first surrounding environment detector sensor (11b) that is the surrounding environment detector sensor having a first detection range (Rb), and
the second target information is acquired on the basis of output of a second surrounding environment detector sensor (11c) that is the surrounding environment detector sensor having a second detection range (Rc) differing from the first detection range (Rb).

13. The electronic controller (20) according to claim 1, wherein the first rider-assistance operation includes a warning operation to the rider or a behavior control operation of the lean vehicle (100),
wherein the warning operation is at least one selected from the group consisting of: display of a warning sign, lighting of a warning lamp, a warning buzzer or voice, and haptic vibration warning, and
wherein the behavior control operation is at least one selected from the group consisting of: reduction in a braking force generated on the lean vehicle 100 and increase in drive power generated on the lean vehicle 100.

14. The electronic controller (20) according to claim 1, wherein the second rider-assistance operation includes a warning operation to the rider or a behavior control operation of the lean vehicle (100),
wherein the warning operation is at least one selected from the group consisting of: display of a warning sign, lighting of a warning lamp, a warning buzzer or voice, and haptic vibration warning, and
wherein the behavior control operation is at least one selected from the group consisting of: reduction in a braking force generated on the lean vehicle 100 and increase in drive power generated on the lean vehicle 100.

15. A rider-assistance system (1) mounted to a lean vehicle (100), the rider-assistance system (1) comprising:
at least one surrounding environment detector sensor (11a, 11b, 11c) configured to output surrounding environment information of the lean vehicle (100), and
an electronic controller (20) configured to:
acquire a first target (T1) located on a side of a travel line (DL) of the lean vehicle (100) based on the surrounding environment information, wherein the surrounding environment information includes first target information for the first target (T1);
initiate a first rider-assistance operation of the rider-assistance system (1) for assisting with driving by a rider of the lean vehicle (100) according to the acquired first target information;
acquire a second target (T2) located on the travel line (DL) of the lean vehicle (100) based on the surrounding environment information, wherein the surrounding environment information includes second target information for the second target (T2);
initiate a second rider-assistance operation of the rider-assistance system (1) for assisting with driving by the rider according to the acquired second target information;
acquire a travel posture of the lean vehicle (100) based on travel posture information of the lean vehicle (100); and
wherein the electronic controller is configured to prohibit the initiation of the first rider-assistance operation while permitting the initiation of the second rider-assistance operation when the travel posture information indicates that leaning of the lean vehicle (100) exceeds a reference and permit the initiation of the first rider-assistance operation and the initiation of the second rider-assistance operation when the travel posture information indicates that leaning of the lean vehicle (100) does not exceed the reference.

16. A control method for a rider-assistance system (1) that is mounted to a lean vehicle (100) and includes at least one surrounding environment detector sensor (11a, 11b, 11c) for outputting surrounding environment information of the lean vehicle (100), the control method comprising:
a first acquisition step (S103) in which an electronic controller (20) acquires a first target (T1) located on a side of a travel line (DL) of the lean vehicle (100) based on the surrounding environment information, wherein the surrounding environment information includes first target information for the first target (T1);
a first execution step (S104, S105) in which the electronic controller (20) initiates a first rider-assistance operation of the rider-assistance system (1) for assisting with driving by a rider of the lean vehicle (100) according to the acquired first target information;

a second acquisition step (S106) in which the electronic controller (20) acquires a second target (T2) located on the travel line (DL) of the lean vehicle (100)) based on the surrounding environment information, wherein the surrounding environment information includes second target information for the second target (T2);

a second execution step (S107, S108) in which the electronic controller (20) initiates a second rider-assistance operation of the rider-assistance system (1) for assisting with driving by the rider according to the acquired second target information;

a third acquisition step (S101) in which the electronic controller (20) acquires a travel posture of the lean vehicle (100) based on travel posture information of the lean vehicle (100); and when the travel posture information, which is acquired in the third acquisition step (S101), indicates that leaning of the lean vehicle (100) exceeds a reference, the electronic controller (20) prohibits the initiation of the first rider-assistance operation and permits the initiation of the second rider-assistance operation and when the travel posture information indicates that leaning of the lean vehicle (100) does not exceed the reference, permit the initiation of the first rider-assistance operation and the initiation of the second rider-assistance operation.

\* \* \* \* \*